Patented May 22, 1945

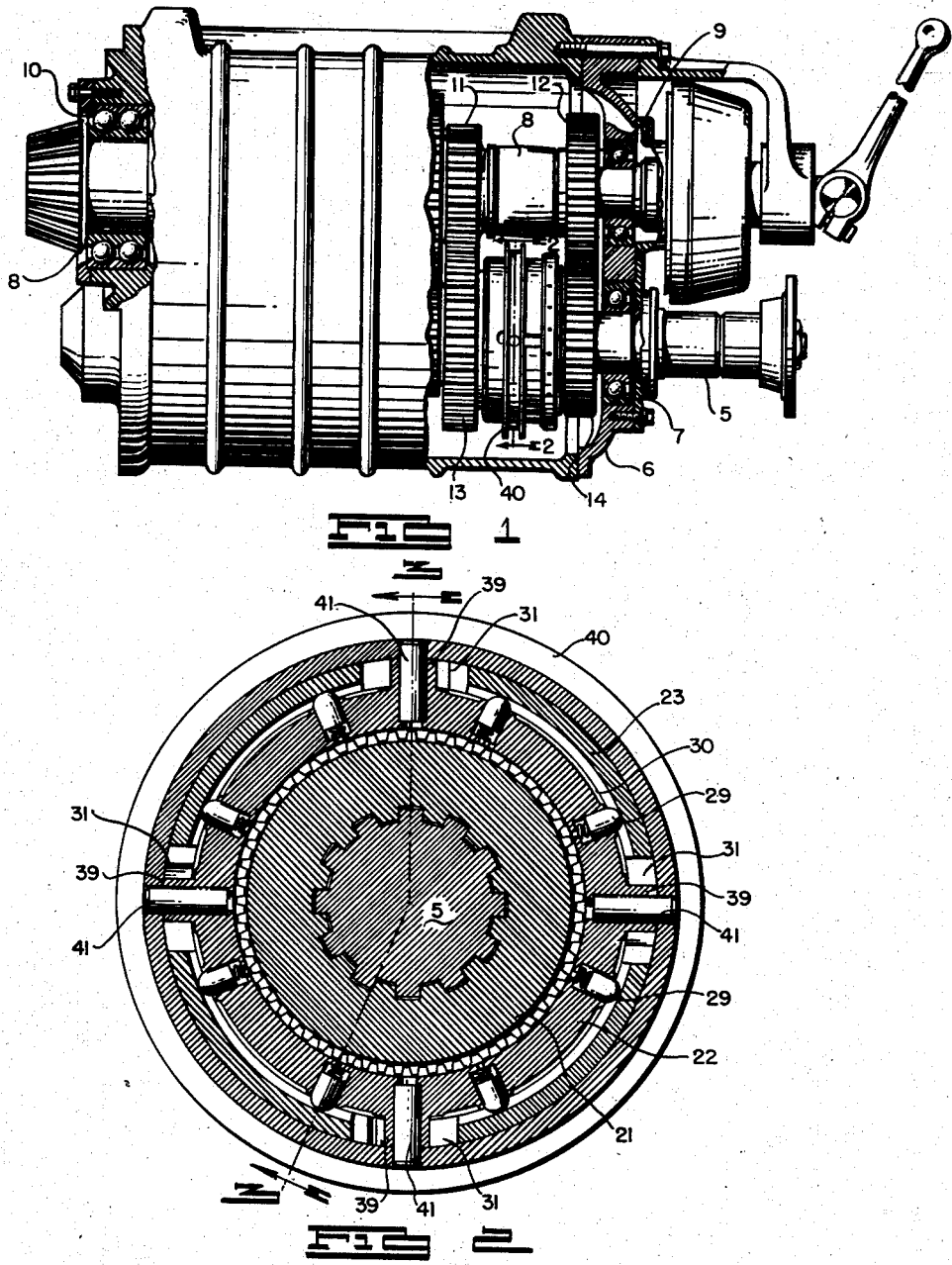

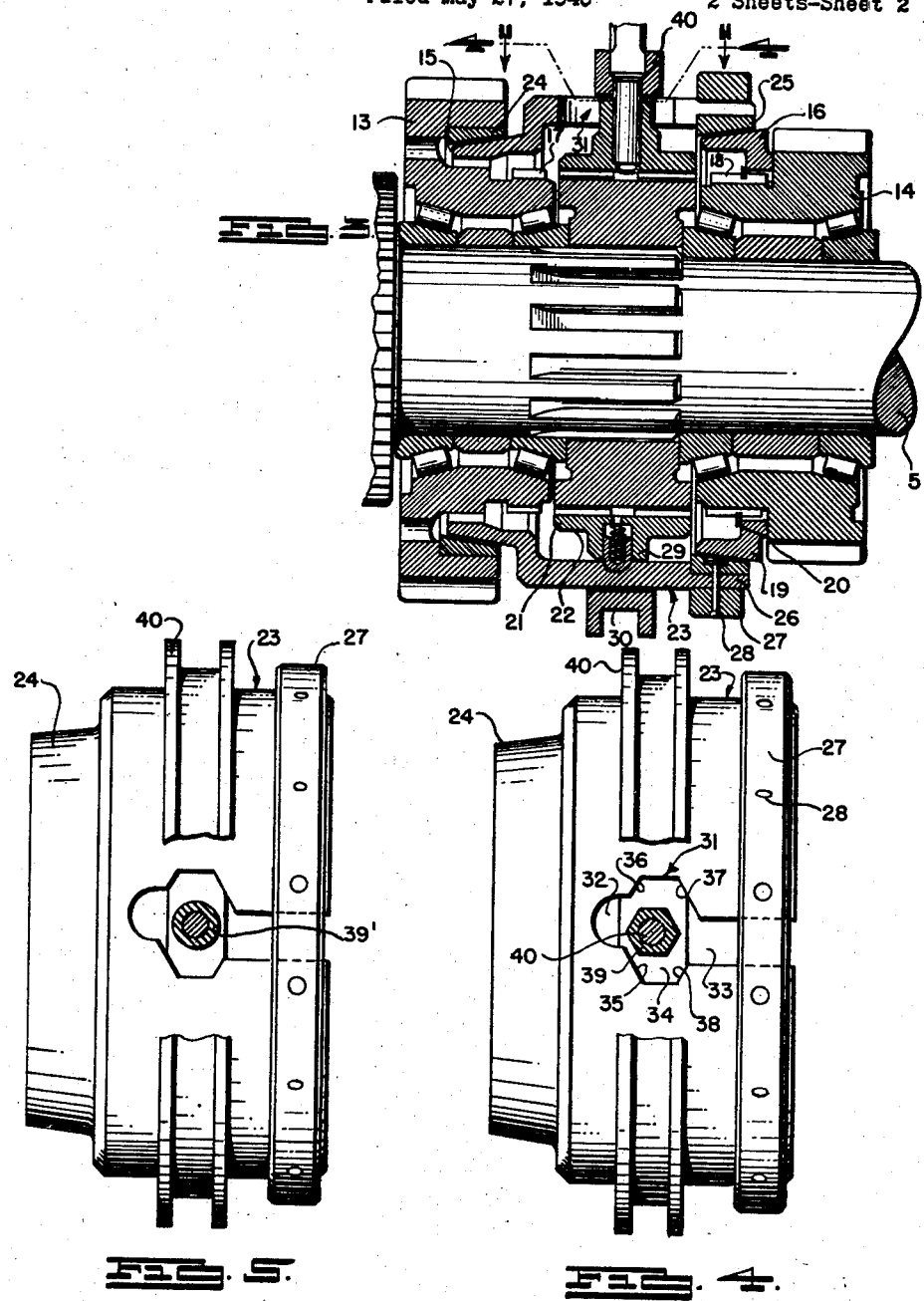

2,376,512

UNITED STATES PATENT OFFICE 2,376,512

SYNCHROMESH TRANSMISSION

Otto W. Schotz, Detroit, Mich., assignor to Chrysler Corporation, Highland Park, Mich., a corporation of Delaware Application May 27, 1943, Serial No. 488,691

8 Claims. (Cl. 192—53)

This invention relates to change speed transmissions and more particularly to improvements in synchromesh mechanisms for use therein.

An object of the invention is the provision of improvements in synchronous clutch mechanisms for blocking clutching action when the parts to be clutched are operating at different speeds and which will accommodate clutching when the parts are operating at approximately the same speed; and to provide a mechanism adapted to effect approximate synchronization of the parts to be clutched prior to the clutching engagement.

Another object of the invention is the provision of an improved mechanism which is bi-directional in its control of the parts adapted to be selectively clutched; and more specifically the invention contemplates improvements in a power transmission comprising relatively rotatable torque transmitting structures and a clutching body shiftable to selectively clutch therewith, together with a blocking member movable between positions respectively blocking and allowing clutching shift of the shiftable body and wherein the blocker member is provided with relatively offset slots and the clutching body having projections cooperating with the slots to control shift of the clutching body.

Other objects of the invention will be more apparent from the following description taken in connection with the accompanying drawings, in which:

Fig. 1 is a side elevational view, partly in section, of a change speed power transmission embodying the invention.

Fig. 2 is an enlarged transverse section taken as indicated by the line 2—2 of Fig. 1.

Fig. 3 is a sectional side elevational view taken on the line 3—3 of Fig. 2.

Fig. 4 is a top plan view showing the clutching control member of Figs. 1, 2 and 3 and a typical connection thereof with the clutching sleeve, taken as indicated by the line 4—4 of Fig. 3, a portion of one of the torque transmitting members being removed to more fully illustrate the control member.

Fig. 5 is a view similar to Fig. 4 but showing a modified form of the clutching sleeve projection.

Referring to the drawings, the invention is illustrated in connection with a power transmission of the type having a plurality of speed ratio drives. The transmission illustrated in Fig. 1 includes an input shaft 5 journaled in a casing structure 6 by bearing units, one of which is shown at 7, and adapted to be driven by a power unit, preferably through the medium of a clutch not shown. An output shaft 8 is journaled in the casing 6, as at 9 and 10, and has a plurality of driven gears, including the gears 11 and 12 of relative different diameters rotatable therewith and respectively in constant mesh with driving gears 13 and 14, of relatively different diameters, which are rotatably journaled on the shaft 5 as more particularly shown in Fig. 3.

The invention is illustrated in connection with the means for selectively drivingly connecting the gears 13 and 14 with the input shaft 5 for transmitting different speed ratio drives to the output shaft 8. The gear 13 has an internal friction face 15 in the form of a portion of a cone and the gear 14 has a similar friction face 16. Corresponding sets of clutch teeth 17 and 18 are rotatably carried by the gears 13 and 14, respectively. The friction face 16 is formed on the external surface of an annulus 19 which has internal teeth meshing with the clutch teeth 18 and which is retained in abutting relation with the gear 14 by a snap spring 20 seated in an annular groove in the teeth 18, all as shown more particularly in Fig. 3. Splined on the shaft 5 is an axially stationary hub 21 having external teeth meshing with teeth of a sleeve 22, as shown in Figs. 2 and 3, the sleeve 22 being adapted for axial shift to selectively positively clutch the teeth thereof with the sets of teeth 17 and 18.

A blocking and synchronizing section is rotatably connected with the clutching sleeve 22, as will more fully be set forth, and includes the annular member 23 having an external friction face 24 in the form of a portion of a cone registering with the face 15 of the gear 13 and an internal friction face 25 in the form of a portion of a cone registering with the face 16 rotatable with the gear 14, the face 25 being carried by an annulus 26. An external reinforcing annulus 27 encircles the member 23 in registration with the annulus 26, the two annuli being riveted to the member 23 as indicated at 28. As shown in Figs. 2 and 3, the member 23 is releasably connected with the sleeve 22 by a plurality of spring-pressed ball detents 29 carried by the sleeve 22 and seated in an annular notch 30 in the internal periphery of the member 23 when the various parts of the mechanism are in their respective illustrated positions.

The member 23 has a plurality of circumferentially spaced axially extending slots, generally designated by the numeral 31, each slot, as shown in Fig. 4, including relatively circumferentially offset portions 32 and 33 and an intermediate or neutral zone 34. Bounding the zone 34 on the side thereof adjacent the portion 32 is a relatively long ramp-like wall 35 having a substantial part thereof disposed axially opposite the portion 33, and a relatively short ramp-like wall 36, and on the side thereof adjacent the portion 33 is a relatively long ramp-like wall 37 similar to the wall 35 having a substantial part thereof disposed axially opposite the slot portion 32 and a relatively short wall 38 similar to the wall 36.

The sleeve 22 has a plurality of radially outwardly extending projections 39 respectively disposed in the slots 31, each projection being hexagonal in cross section. Radially extending openings are formed in the sleeve 12 at each projection 39 and respectively register with openings in a shift collar 40, a pin 41 extending into the registering openings operatively connecting the sleeve with the collar 40. The latter has a channel adapted to receive a shifter fork, not shown, of any suitable shift mechanism.

The projections 39 in cooperation with the associated slots 31 form a rotatable connection between the sleeve 22 and the blocker member 23, with a clearance therebetween, as shown in Figs. 2 and 4, accommodating relative rotation of the sleeve 22 and member 23 whereby the latter is positioned to respectively block and allow clutching shift of the sleeve 22, to selectively clutch with the sets of teeth 17 and 18 as will be more fully set forth hereafter.

Referring to Fig. 5, the construction is the same as that in Figs. 1, 2, 3 and 4, with the exception of the projections 39, which are round in cross section.

In the operation of the mechanism it will be understood that the output shaft 8 will be driven at relatively different speeds with respect to the input shaft 5 by selectively clutching the sleeve 22 with the gears 13 and 14. The sleeve 22 is shown in its neutral position and as a typical example of the operation of the mechanism let it be assumed that the shaft 8 is to be driven from the shaft 5 through the gears 12 and 14. The shaft 5 is declutched from the engine drive and the sleeve 22 is shifted to the right as viewed in Fig. 3 under an asynchronous condition with respect to the gear 14 and sleeve 22. By reason of the connection provided by the detents 29 acting in the annular notch 30 the member 23 is shifted to the right with the sleeve 22 to engage the friction faces 16 and 25 and due to the aforesaid asynchronous condition the member 23 and sleeve 22 are subjected to relative rotation so that one or the other of the ramp-like walls 37, 38 of each slot is engaged by a side of the associated projection 39 to thereby block movement of the latter into the slotted portion 33 and thus momentarily interrupt clutching shift. Assuming that the shaft 5 is rotating in a counter-clockwise direction as viewed from left to right in Fig. 1 and at a speed faster than the gear 14, then the projection 39 will engage with the wall 38. Should the gear 14 be rotating at the faster speed, then the projection will engage with the wall 37. The pressure applied to the engaged ramps by reason of the shift will force the face 25 into frictional driving engagement with the face 16 to thereby produce a synchronous condition with respect to the sleeve 22 and gear 14 whereupon the member 23 and sleeve 22 are subjected to relative rotation by the shifting force to thereby relatively align the projections 39 and the respective slot portions 33 for movement of the former into the latter, the detent connection releasing the member 23 from the sleeve 22 for relative axial shift of the latter by movement of the detents 29 from the notch 30 to clutch with the set of teeth 18.

When the parts are positioned as aforesaid during clutching engagement of the sleeve 20 with the teeth 18, it will be understood that the ramp-like wall 35 at one side of slot 32 has a substantial part thereof disposed in axial alignment with the slot 33, and in shifting the sleeve 22 to clutch with the set of teeth 17 should the detents 29 fail to reseat in the notch 30, due to the rapidity of the shift, for preliminarily engaging the friction faces 15 and 24 to dispose the member in blocking position, the projections will engage with the ramp walls 35, blocking clutching shift of the sleeve until a synchronous condition exists with respect to the sleeve 22 and teeth 17. However should the detents reseat in notch and shift the member 23 with the sleeve 20, the preliminary engagement of the faces 16, 24 will induce relative rotation of the member 23 and sleeve 22 to engage the projections 39 with the walls 35 should the rotative speed of the sleeve 22 (shaft 5) be at a higher rate than that of the gear 13, otherwise the projections will engage with the walls 36, in either event to block clutching shift of the sleeve 20.

It will be understood, of course, that in the event the detent connection 29, 30 should fail in its function as aforesaid in the shift of the sleeve from its clutching position with the teeth 17 to clutch with the teeth 18, then the walls 37 will be engaged by the projections to block this shift.

The operation of the Fig. 5 embodiment is the same as that set forth above.

Although but various embodiments of the invention is herein shown and described, it will be understood that various changes in the size, shape and arrangement of parts may be made without departing from the spirit of my invention and it is not my intention to limit said invention other than by the terms of the appended claims.

I claim:

1. In a power transmission mechanism including torque transmitting members each having a set of clutch teeth and a friction face rotatable therewith; a clutch structure shiftable axially to selectively clutch with said members comprising a friction section having friction faces respectively associated with first friction faces, and a clutching section shiftable axially to selectively clutchingly engage said sets of teeth, one of said sections having an axially extending slot including relatively circumferentially offset axial end portions each having a flared entrance and the other of said structures having a projection disposed in said slot forming a driving connection between said structures, at least one wall of the flared entrance of each of said slotted portions having a part thereof axially opposite the other slotted axial end portion and engageable by said projection as the latter is moved from one of said portions to the other thereof to thereby block clutching shift of said clutching section and engage a pair of associated friction faces under synchronizing pressure, said connection accommodating relative rotary movement of said sections when said synchronizing engagement is established to allow completion of said clutching shift.

2. In a power transmitting mechanism including a pair of spaced power transmitting members each having a friction face and a set of clutch teeth rotatable therewith; a synchronizing clutch rotatable relative to said members and axially oppositely shiftable to selectively clutch with said sets of teeth, including rotatably connected radially inner and outer structures, said outer structure including friction faces respectively registering with and adapted to coact with the first friction faces to establish a synchronizing drive therebetween, said inner structure including teeth adapted to selectively clutchingly engage with said sets of clutch teeth, one of said structures having a projection rotatable therewith and the other thereof having an axially extending slot including a first axial end portion adapted to receive said projection when said inner structure is shifted in one of its directions and a second end portion circumferentially offset from the first portion adapted to receive said projection when the inner structure is shifted in its other direction, and a ramp axially opposite each of said slotted axial end portions engageable with said projection as the latter is shifted from one of said portions to the other thereof to thereby block clutching shift of the inner structure and to establish the synchronizing drive as aforesaid between the clutch and member selected for clutching engagement, said rotatable connection accommodating relative rotation of said structures when said drive is established to allow completion of said clutching shift.

3. In a power transmission mechanism including relatively rotatable structures each having a friction clutch member and a set of clutch teeth, a toothed sleeve section adapted for axially opposite shift to selectively clutchingly engage with said sets of clutch teeth, a synchronizing control structure including a member having a rotatable connection with said sleeve section and having friction members respectively registering with and adapted to engage the first mentioned friction members to establish a synchronizing drive therebetween, said member having a slot including a circumferentially elongated portion and axially oppositely extending portions communicating with said elongated portion in circumferentially offset relation one relative to the other and respectively accommodating shift of said sleeve section as aforesaid, and a ramp axially opposite each of said slotted portions engageable by said sleeve to block said clutching engagement thereof and to establish the synchronizing drive between a pair of said registering friction members, said rotatable connection accommodating relative rotation of said member and said sleeve when said drive is established to thereby accommodate said clutching engagement.

4. In a power transmission mechanism including a shaft and torque transmitting members coaxial therewith and rotatable relative thereto each including a set of clutch teeth and a friction face, a toothed sleeve rotatable with the shaft located between said members and shiftable axially in opposite directions to selectively clutchingly engage with said sets of clutch teeth, a collar encircling said sleeve and rotatably connected therewith having friction faces adapted to respectively coact with the friction faces of said members to establish a synchronizing drive between the latter and said sleeve, said sleeve including a projection and said collar including a generally axially extending slot having relatively circumferentially offset axial end portions adapted to respectively receive said projection when said sleeve is selectively clutched as aforesaid, said collar including a wall adjacent the entrance of each of said slotted end portions having at least a part thereof axially aligned with the other slotted end portion and defining a ramp selectively engageable by said projection when the latter is moved from one of said slotted end portions to the other thereof to thereby block clutching shift of the sleeve and to establish the synchronizing drive between the sleeve and the member selected for clutching engagement, said rotatable connection accommodating relative rotation of the sleeve and collar when said synchronizing drive is established to thereby so position the projection and the slotted end portion adjacent the engaged ramp as to accommodate entrance of the projection into said slotted portion.

5. In a power transmission mechanism having axially spaced speed ratio gearing; a synchronizing clutch intermediate said gearing rotatable relative thereto and shiftable to selectively clutchingly engage therewith including a friction section and a toothed section shiftable as a unit in either direction from neutral to preliminary engagement of the friction section to effect synchronization in advance of shifting of the toothed section, the toothed section being shiftable axially relative to the friction surface after synchronization to effect clutching engagement, one of said sections having a projection and the other thereof having a slot receiving said projection, said slot including axially extending relatively circumferentially offset portions adapted to selectively receive said projection to thereby accommodate said relative axial shifting of said structures and an intermediate portion, and a ramp axially opposite each of said slotted portions bounding said intermediate portion and engageable by said projection for shifting said structures as a unit as aforesaid, said intermediate slot portion and projection having rotative clearance accommodating relative rotary movement of said ramp and projection to thereby relatively align the latter with the slotted portion toward which it is shifted.

6. In a power transmission mechanism including a pair of power transmitting elements and a clutching structure therebetween normally rotatable relative thereto and adapted to selectively positively clutch therewith, said structure including a pair of cooperating members axially shiftable as a unit to selectively establish a synchronizing drive between the clutching structure and each of said elements and relatively axially shiftable when said drive is established to effect said clutching engagement, one of said members having axially oppositely extending relatively circumferentially offset slots each so flared at the entrance thereof as to provide a circumferentially elongated intermediate zone and a ramp at the entrance of each of said slots, and the other of said members having a projection selectively movable in said slots and engageable with said ramps for shifting said members as a unit as aforesaid, said projection when disposed in said intermediate zone accommodating relative rotation of said members when said synchronizing drive is established whereby said projection and said slot are positioned for movement of the former in the latter to effect relative shifting of said members.

7. In a power transmitting mechanism including spaced power transmitting members, each including a set of clutch teeth and a friction surface, a power transmitting clutching sleeve section axially oppositely shiftable to respectively clutch with said sets of clutch teeth, a collar axially oppositely movable encircling said sleeve section having a driving connection therewith accommodating limited rotation of the collar therebetween, said collar including friction surfaces respectively registering with and adapted to engage the first mentioned friction surfaces under synchronizing pressure in response to movement of said collar as aforesaid, said collar having a slot therein receiving a part of said sleeve section and accommodating axial shift of the latter as aforesaid, said slot having a relatively enlarged zone intermediate the longitudinal extremities thereof bounded by a pair of circumferentially opposite end walls and a pair of walls diverging from each end wall toward the other thereof, a wall of each of said pairs extending beyond the other thereof and being respectively engageable by said sleeve portion in response to shift of said sleeve for moving said collar as aforesaid whereby to place a pair of said registering friction surfaces under synchronizing pressure prior to clutching engagement of the sleeve with the adjacent set of clutch teeth.

8. In a power transmission mechanism including power transmitting elements and a clutching structure adapted to be selectively clutched therewith, said structure including a first member shiftable to selectively clutch with said elements and a second member rotatable relative to said first member to respectively block and accommodate said clutching shift, said second member including a slot and said first member having a projection movable therewith, said slot having a first end portion adapted to receive said projection therein when said first member is clutched with one of said elements and a second end portion circumferentially offset relative to said first end portion adapted to receive said projection therein when said first member is clutched with the other of said elements, and means rotatable with said second member and cooperating with said projection to block shift of said first member to clutch with at least one of said elements.

OTTO W. SCHOTZ.